US006099919A

United States Patent [19]

Ito

[11] Patent Number: 6,099,919

[45] Date of Patent: Aug. 8, 2000

[54] METHOD FOR MANUFACTURING DIELECTRIC FILTER

[75] Inventor: Kenji Ito, Matsuzaka, Japan

[73] Assignee: NGK Spark Plug Co., Ltd., Aichi, Japan

[21] Appl. No.: 09/034,302

[22] Filed: Mar. 4, 1998

[30] Foreign Application Priority Data

Mar. 4, 1997 [JP] Japan .................................... 9-049202
Feb. 27, 1998 [JP] Japan .................................. 10-047950

[51] Int. Cl.[7] ...................................................... B01J 19/10

[52] U.S. Cl. .......................... 427/560; 427/123; 427/271; 427/304; 427/443.1

[58] Field of Search .............................. 427/98, 256, 271, 427/304, 437, 443.1, 553, 554, 555, 558, 560, 123

[56] References Cited

U.S. PATENT DOCUMENTS 4,686,114 8/1987 Halliwell et al. ...................... 427/53.1
4,870,751 10/1989 Antoon ...................................... 29/846
4,882,200 11/1989 Liu et al. ............................... 427/53.1
5,474,488 12/1995 Yamamoto et al. ...................... 451/28
5,499,004 3/1996 Noguchi et al. ........................ 333/202

FOREIGN PATENT DOCUMENTS 230663 9/1993 Japan .

*Primary Examiner*—Brian K. Talbot
*Attorney, Agent, or Firm*—Sughrue, Mion, Zinn, Macpeak & Seas, PLLC

[57] ABSTRACT

There is disclosed a method of manufacturing a dielectric filter in which the dielectric filter can be manufactured in a short time, machining accuracy is raised and a cutting tool is prevented from being easily damaged. First in a degreasing process (S1), a surface of a porcelain element body 2 is cleaned. In a surface roughing process (S2), in order to enhance the adhesion of a plating layer to be formed later, the surface of the porcelain element body 2 is etched to form a rough face. Subsequently, after a catalyzer layer is formed entirely on the surface of the porcelain element body 2 (S3), a portion of the catalyzer layer is removed with an ultrasonic cutter (S4). Then, formed is a region on which an insulating region is to be formed. Subsequently, in a plating process (S5), a conductive layer is formed on a region other than the insulating region. The dielectric filter is thus manufactured. Since the catalyzer layer is thin, it can be removed in a short time, and is superior in productivity. The ultrasonic cutter requires to provide only a small power. Therefore, machining accuracy is enhanced, and the running cost can be reduced.

5 Claims, 4 Drawing Sheets

METHOD FOR MANUFACTURING DIELECTRIC FILTER

BACKGROUND OF THE INVENTION

1. Field of the Invention

The present invention relates to a method of manufacturing a dielectric filter, particularly to a method of manufacturing a dielectric filter which is provided with a conductive layer sectioned by an insulating region on a surface of a porcelain element body.

2. Description of the Related Art

A dielectric filter is constituted, for example, by making a resonant hole in a porcelain element body formed of a dielectric material. On a surface (inner surface) of the resonant hole or an outer surface of the porcelain element body provided is a conductive layer which is sectioned by an insulating region. As manufacture methods, a screen printing technique for forming a conductive layer by using a silver paste and an electroless plating technique with copper for forming the conductive layer are known.

In the screen printing technique, each face of the porcelain element body needs to be printed and dried. Since a large number of processes are required for repeating printing and drying, a period of time for the manufacture is disadvantageously prolonged. Also in the screen printing, the enhancement of pattern precision is restricted. In a subsequent process, the conductive layer required to be trimmed, which deteriorates the productivity.

In the electroless plating technique, a masking material of resin or the like is applied beforehand to the insulating region where an insulated state should be kept. Subsequently, a catalyzer application process is performed in such a manner that no catalyzer layer is formed on the insulating region. Then, a plating process is performed.

However, even when the masking material is used, a conductive metal is deposited on the masked region in many cases. As a result, insulation defects are caused. Therefore, after the plating process a process for removing an excessively deposited plating is necessary. Hence, product quality is deteriorated, and only a poor productivity is provided.

To solve the problem with the electroless plating technique, a manufacture method disclosed in the Japanese Patent Application Laid-open No. Hei 6-334414, partially removes a surface plating layer with an ultrasonic cutter to form an insulating region.

In the method, the plating layer is removed by an ultrasonic cutter to form the insulating region. The, the ultrasonic cutter is required to remove a hard and thick plating layer of e.g., copper with a thickness of, e.g., 2 to 10 $\mu$m. Therefore, when the insulating region is formed, a period of time of one second or more is necessary for removing the plating layer, which fails to improve productivity.

Also, in the conventional method in which the hard and thick plating layer is removed, the ultrasonic cutter is required to provide power of 50 W or more. During such a process machining accuracy is lowered, and the cutting tool is easily damaged. Therefore, a cost for replacing the cutting tool disadvantageously contributes to the increase of cost for manufacturing dielectric filters.

SUMMARY OF THE INVENTION

Wherefore, an object of the invention is to provide a method for manufacturing a dielectric filter in which a processing is performed in a short period of time, machining accuracy is raised and a cutting tool is not easily damaged.

To attain this and other objects, the present invention provides a method of manufacturing a dielectric filter which is provided with a conductive layer sectioned by an insulating region on a surface of a porcelain element body. The method is provided with a catalyzer application process for forming a catalyzer layer on a surface of the porcelain element body for electroless plating, a removal process for removing the catalyzer layer from the insulating region to be insulated on which no conductive layer is formed, and an electroless plating process for plating a region of the porcelain element body with the conductive layer formed thereon.

In the invention, by removing the catalyzer layer from a region which is to form the insulating region, the subsequent electroless plating process does not form a plating layer on the insulating region. The insulating region of the dielectric filter according to the invention is thus formed. Since the catalyzer layer is remarkably thinner than the plating layer, it can be m ore easily removed than the plating layer.

Therefore, according to the invention, the insulating region can be easily formed and productivity of the dielectric filter is enhanced.

Also, since the catalyzer layer can be easily removed, the load on a cutting tool or a removing medium of a removing device for use in the removal process is reduced. The running cost of the removing device is also reduced. As a result, the cost for the manufactured dielectric filter can be reduced.

Further, the removing device needs to provide only a smaller output or a lower potential as compared with the prior art. The precision of removing the catalyzer layer from the insulating region is enhanced, and a high-quality dielectric filter can be manufactured.

In the method of manufacturing the dielectric filter according to the invention, during the removal process, the catalyzer layer is removed by grinding or polishing.

The grinding or the polishing can be performed by using a brush, a sand blast, an ultrasonic vibration or other various measures for grinding or polishing.

The catalyzer layer is remarkably thinner and more easily removed than the plating layer. Therefore, the catalyzer layer can be easily removed through grinding or polishing. As a result, the operation time can be shortened, while the productivity is enhanced.

In another aspect of the method of manufacturing the dielectric filter, during the removal process, the catalyzer layer is removed by an ultrasonic cutter.

As aforementioned, the catalyzer layer is remarkably thin. Therefore, even when the conventional ultrasonic cutter is used, the operation time can be shortened, while the productivity is enhanced. Also, the ultrasonic cutter needs to have only a small power. As a result, different from the conventional method, machining accuracy is enhanced, and the cutting tool is inhibited from being damaged.

In the method of manufacturing the dielectric filter according to the invention, the catalyzer layer removed in the removal process is a pad insulting region which insulates at least a periphery of an input/output pad of the dielectric filter.

The pad insulating region for insulating the periphery of the input/output pad is required to have high precision. Therefore, according to the invention, machining accuracy is enhanced as compared with the conventional method, and a high-quality dielectric filter is obtained.

DETAILED DESCRIPTION OF THE PREFERRED EMBODIMENTS

Embodiments of the invention will be described with reference to the accompanying drawings.

First Embodiment

Figure 1:
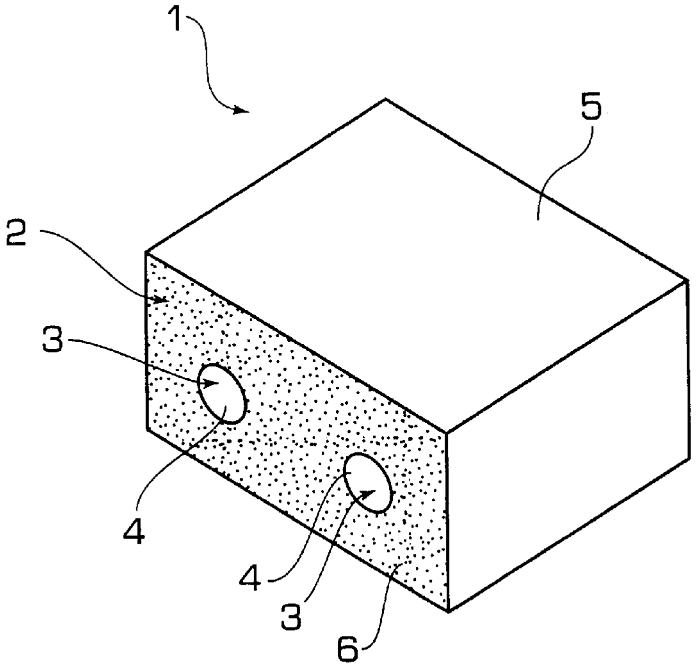
FIG. 1 is a perspective view of a dielectric filter according to a first embodiment of the invention.

FIG. 1 shows a dielectric filter manufactured according to a first embodiment. A comb-line dielectric filter 1 is provided with a hexahedral porcelain element body 2 of ceramic. The porcelain element body 2 has a size of 6.0 mm×8.0 mm×2.5 mm. Two resonant holes 3 each having a diameter of 0.8 mm are formed parallel through the porcelain element body 2. Inner conductive layers or inner conductors 4 are formed on peripheries which define the resonant holes 3. Also, outer conductive layers or outer conductors 5 are formed on outer surfaces of the porcelain element body 2.

Figure 2:
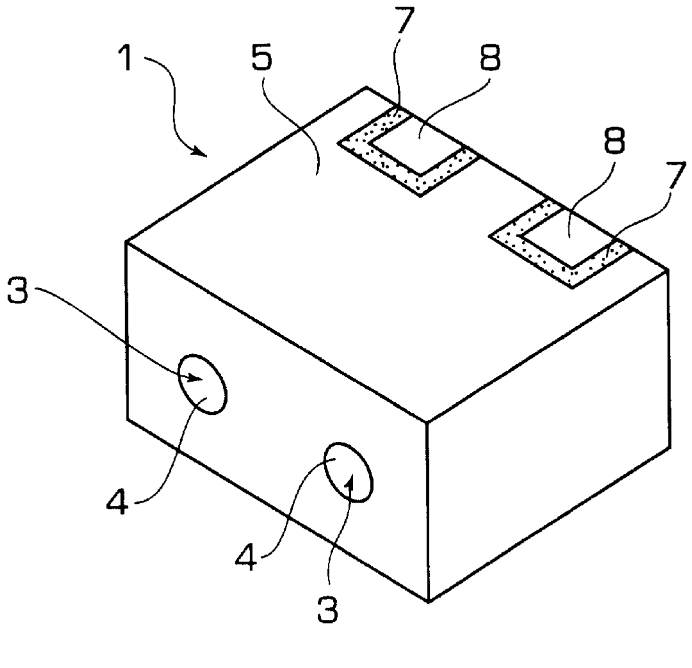
FIG. 2 is a perspective view wherein the dielectric filter shown in FIG. 1 is turned over.

The inner conductors 4 and the outer conductors 5 are partially electrically insulated by insulating regions 6 and 7 which are provided on predetermined regions of a surface of the dielectric filter 1. As seen from FIG. 2, the insulating region 6 is formed as a resonant-hole insulating region on one side face of the porcelain element body 2 to which the resonant holes 3 open. One end of each inner conductor 4 is electrically insulated from each outer conductors 5, while the other end of the inner conductor 4 is electrically connected to the outer conductor 5. Also, as shown in FIG. 2, as the insulating regions 7, two U-shaped pad insulating regions are formed along one side edge of a bottom face which is laid on a printed circuit board or adjacent to the resonant-hole insulating region 6. Input/output pads 8 are formed inside the pad insulating regions 7, and are electrically insulated from the outer conductors 5 on their peripheries. The input/output pad 8 has a size of 1.0 mm×1.0 mm, and the insulating region 7 has a width of 0.7 mm. The input/output pads 8 are capacity-coupled to the inner conductors 4 of the resonant holes 3. The dielectric filter 1 constituted as aforementioned is used as a dielectric resonant component.

A method of manufacturing the dielectric filter 1 of the embodiment will be described.

As starting materials used were $BaCO_3$, $Nd_2O_3$, $Y_2O_3$ and $TiO_2$ each having a purity of 99.9%. They were weighed and mixed to obtain 17.9 mol % of BaO, 12.0 mol % of $Nd_2O_3$, 70.01 mol % of $TiO_2$ and 7.6 mol % of $Y_2O_3$. After the primary dry-grinding and mixing in a mixer, the material was calcined at a temperature of 1100° C. in the atmosphere for four hours. Further, a proper quantity of organic binder and pure water were applied to the calcined material. After the wet-grinding in an alumina ball mill, the material was granulated through spray drying. The granulated material was press-formed into a block with two holes provided therein as the resonant holes 3. The block was sintered at a temperature from 1300° C. to 1350° C. in the atmosphere for two hours, to obtain the porcelain element body 2.

Figure 3:
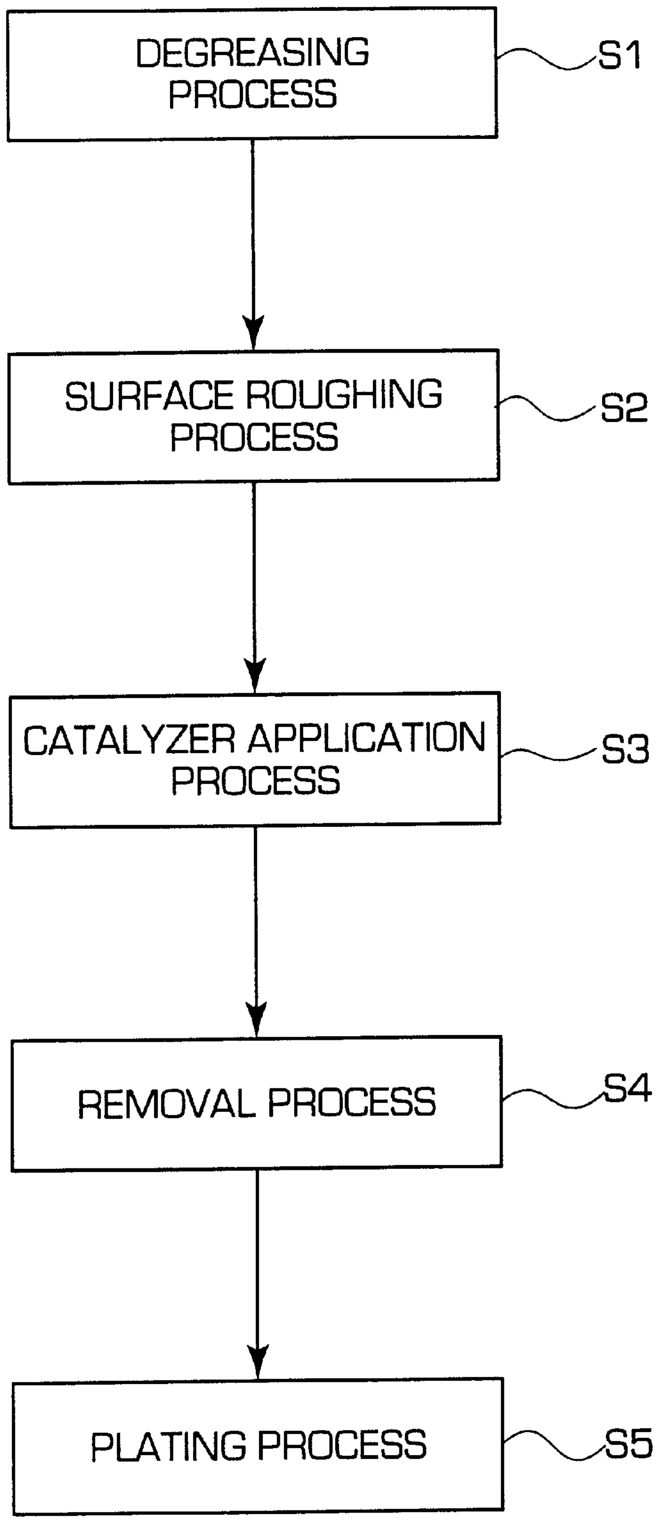
FIG. 3 is a flowchart showing a method of manufacturing a dielectric filter according to the invention.

Subsequently, as shown in FIG. 3, a degreasing process S1 was performed to clean the surface of the porcelain element body 2. In the process, the porcelain element body 2 was thrown into a barrel which contained 2% of phenolic surfactant and was kept at 50° C., and the barrel was rotated and swung for two minutes. Through the process, grease and the other pollutants were removed from the surface of the porcelain element body 2. The wettability of the surface was thus enhanced.

Subsequently, at a surface roughing process S2, in order to enhance the adhesion of a plating layer formed in the subsequent process, the surface of the porcelain element body 2 was etched and roughed. In the etching process, the porcelain element body 2 was thrown into a barrel which contained 10% of $H_2SO_4$ and 1.0% of HF and was kept at 50° C., and the barrel was rotated and swung for thirty minutes.

Subsequently, a catalyzer application process S3 was performed. In the process, the porcelain element body 2 subjected to the surface roughing process was first immersed for sixty seconds in a sensitizing agent including 3% of stannous chloride and 18% of sodium chloride and being kept at a room temperature, washed with water, and then immersed for sixth seconds in a 0.15% palladium chloride liquid kept at room temperature. Through the process, the catalyzer layer of a thin-film palladium was formed on the surface of the porcelain element body 2.

Figure 4:
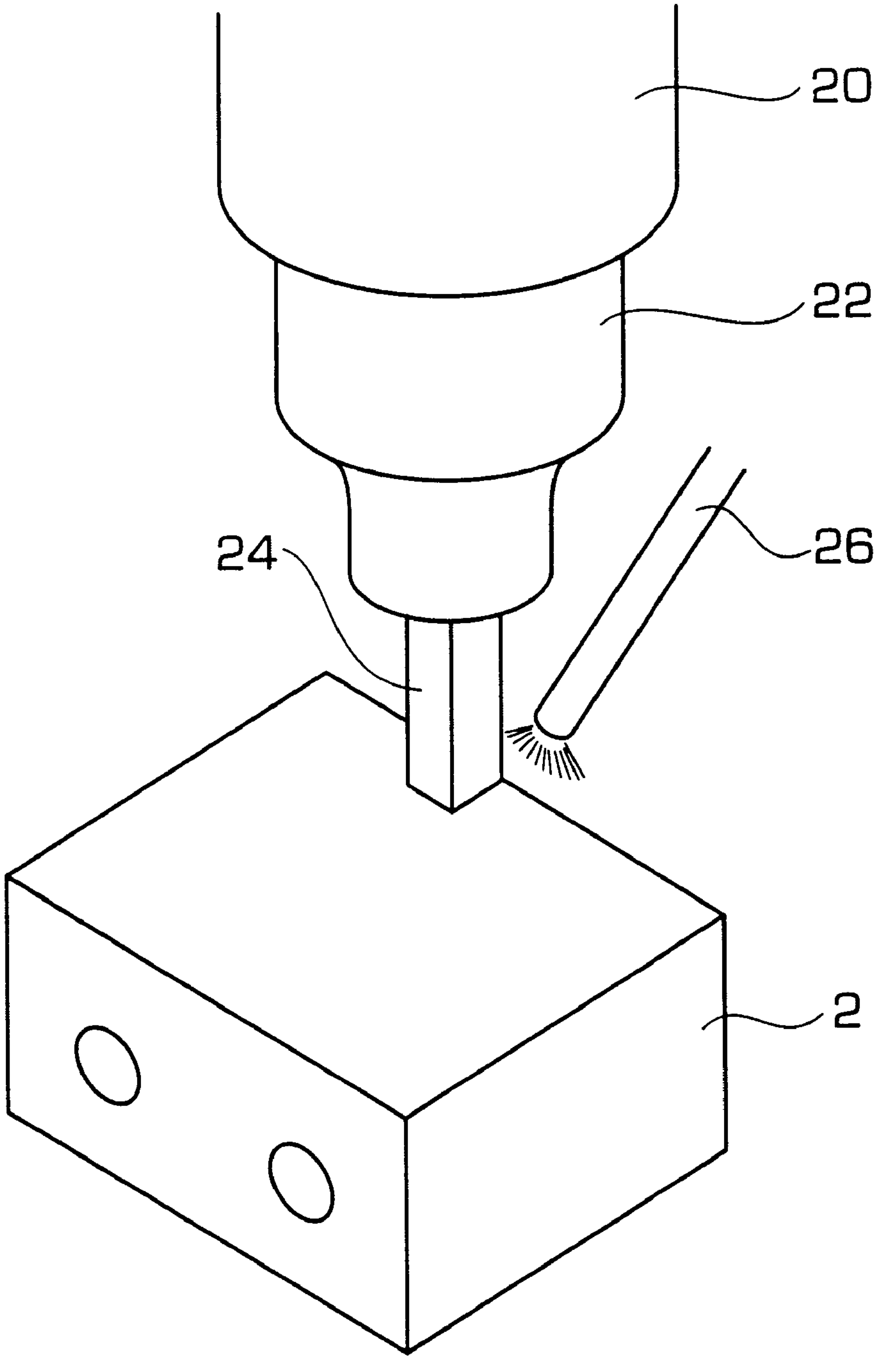
FIG. 4 is a diagrammatic partial view of an ultrasonic cutter for use in the manufacture of the dielectric filter according to the invention.

Subsequently, in a catalyzer layer removal process S4, the catalyzer layers were removed from portions corresponding to the aforementioned resonant-hole insulating region 6 and the pad insulating regions 7 by using an ultrasonic cutter shown in FIG. 4. The ultrasonic cutter is provided with a table (not shown) which can move in directions orthogonal to each other. The porcelain element body 2 is held on the table. The ultrasonic cutter is provided with an ultrasonic generator 20, an amplification horn 22 for amplifying ultrasonic waves, a tool 24 and a nozzle 26 for spouting cutting water including abrasive grains. The tool 24 has a cross section substantially the same in configuration as the insulating regions 7 of the porcelain element body 2. The ultrasonic generator 20 has an output of 30 W and a resonance frequency of 25 KHz. In addition, though a single tool 24 is shown in FIG. 4, it is preferably to provide a proper number of tools 24 according to the cutting parts.

The ultrasonic cutting process will be described. First, the porcelain element body 2 was fixed onto the table, and the table was moved in such a manner that a region to be formed as an insulating region was positioned under the tool 24. Subsequently, cutting water was supplied from the nozzle 26 to a processed face, and ultrasonic waves were generated by the ultrasonic generator 20. An ultrasonic vibration was amplified by the amplification horn 22 and transmitted to the tool 24. Thereby, the abrasive grains existing between the tool 24 and the processed face were vibrated. The catalyzer layers were thus removed. A period of time necessary for the removal of the catalyzer layer was 0.1 to 0.5 seconds.

Subsequently, in a plating process S5, the porcelain element body 2 was immersed in an electroless plating liquid for 15 minutes, to form a copper plating layer with a thickness of 2 $\mu$m.

Thereafter, the porcelain element body 2 was washed with water and dried. Thereby, the dielectric filter of the first embodiment was obtained.

According to the first embodiment, after the catalyzer application process and before the electroless plating, the catalyzer layer is removed from the region to be formed as the insulating region, and the plating layer is prevented from being formed on the region. In this manner, the insulating regions 6 and 7 of the dielectric filter 1 are obtained. Since the catalyzer layer is remarkably thinner than the plating layer, the catalyzer layer can be removed in a short time by the ultrasonic cutter having a smaller output as compared with the conventional method. As a result, the productivity of the dielectric filter 1 is enhanced. Also, since the ultrasonic cutter requires only a small output, especially the removing precision of the pad insulating region 7 is enhanced. The quality of the manufactured dielectric filter 1 can also be enhanced. Further, the ultrasonic cutter is used only for removing a remarkably thin catalyzer layer. Therefore, the load applied onto the cutting tool of the ultrasonic cutter is reduced, and the running cost is lowered. Consequently, the cost of the manufactured dielectric filter 1 can be reduced.

In the first embodiment, the resonant-hole insulating region 6 and the pad insulating region 7 are formed by removing the catalyzer layer in the removal process to prevent the plating layers form being formed on the relevant regions. Alternatively, only the pad insulating region 7 is formed by removing the catalyzer layer in the removal process, while the resonant-hole insulating region 6 may be formed through other measures, for example, by using a surface grinder.

Second Embodiment

Figure 5:
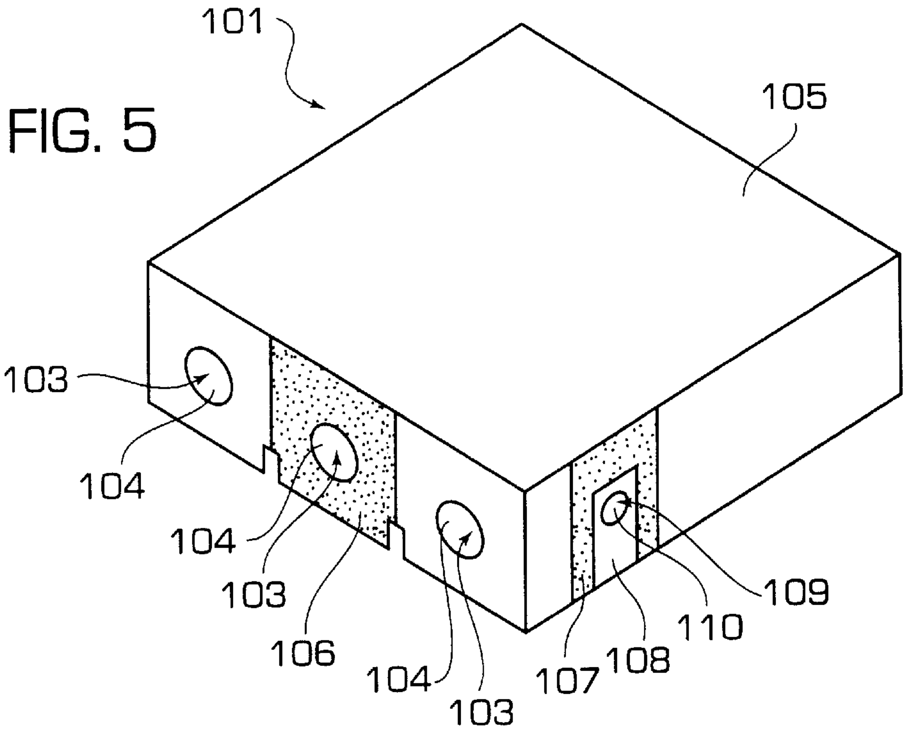
FIG. 5 is a perspective view of a dielectric filter according to a second embodiment of the invention.
Figure 6:
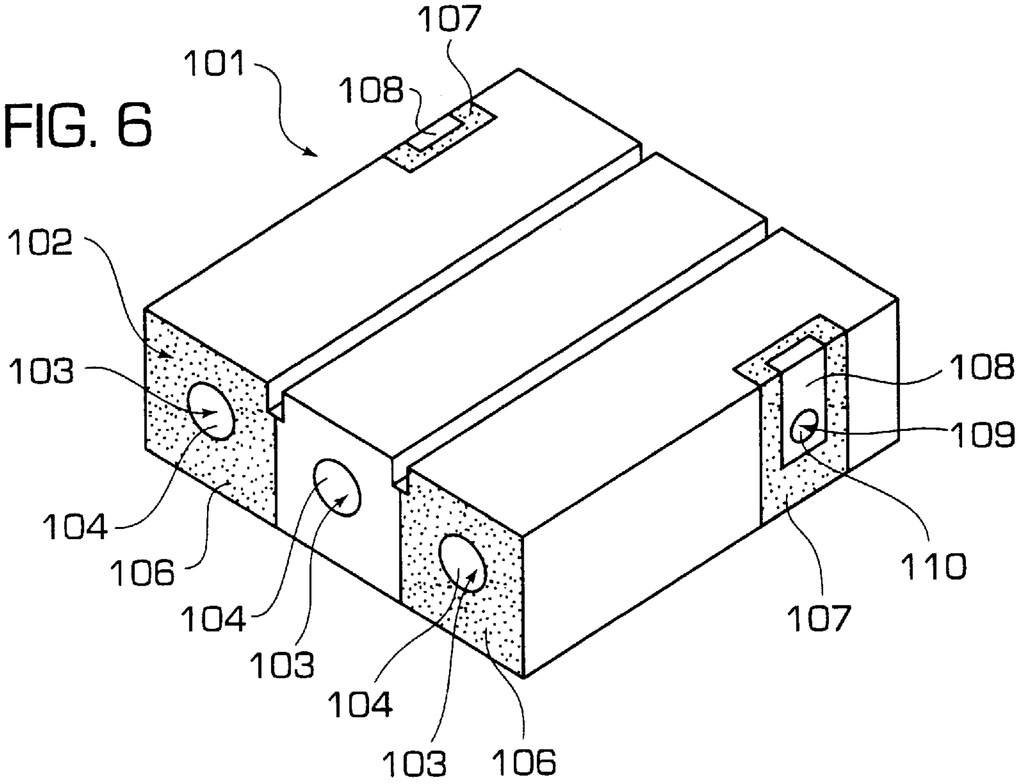
FIG. 6 is a perspective view wherein the dielectric filter shown in FIG. 5 is turned over.

A second embodiment relates to a method of manufacturing an interdigital dielectric filter. In the second embodiment, as shown in FIGS. 5 and 6, a dielectric filter 101 has a thin hexahedral porcelain element body 102 of ceramic. The porcelain element body 102 has a size of 8.7 mm×9.0 mm×2.9 mm. The porcelain element body 102 is manufactured in the same manner as in the first embodiment. The porcelain element body 102 is provided with three resonant holes 103 formed therethrough. Each resonant hole 103 has a diameter of 0.8 mm. Conductive layers or inner conductors 104 are formed on peripheries which define the resonant holes 103. Also conductive layers or outer conductors 105 are formed on outer surface of the porcelain element body 102.

The inner conductors 104 and the outer conductors 105 are partially electrically insulated by insulating regions 106 and 107 which are formed on predetermined regions of a surface of the dielectric filter 101. As shown in FIGS. 5 and 6, resonant-hole insulating regions 106 are formed on a middle portion of one side face of the porcelain element body 102 to which the middle resonant hole 103 opens and on opposite portions on the other side face of the porcelain element body 102 to which the opposite resonant holes 103 open. Ends of the three resonant holes 103 are alternately electrically connected to the outer conductors 105.

Also, as shown in FIG. 6, two square pad insulating regions are on corners extended between a bottom face which is laid on a printed circuit board and side faces of the dielectric filter 101. Input/output pads 108 are provided on the pad insulating regions 107, and electrically insulated from the outer conductors 105. Side holes 109 are formed through the input/output pads 108 toward the resonant holes 103. Each side hole 109 has a diameter of 0.5 mm. Conductors 110 are formed on peripheries of the side holes 109. The input/output pads 108 are electrically connected to the inner conductors 104 of the resonant holes 103. Each input/output pad 108 of the bottom surface of the dielectric filter 101 has a size of 0.5 mm×1.0 mm. Each insulating region 107 has a width of 0.5 mm.

The interdigital dielectric filter 101 is manufactured in the same method as in the first embodiment. Specifically, the resonant-hole insulating regions 106 and the pad insulating regions 107 are formed by removing catalyzer layers from relevant portions with an ultrasonic cutter in the removal process S4 of the first embodiment and preventing plating layers from being formed on the regions. The same effect as in the first embodiment can be obtained.

Also in the second embodiment, the resonant-hole insulating regions 106 and the pad insulating regions 107 are formed by removing the catalyzer layers in the removal process. Alternatively, only the pad insulating regions 107 are formed by removing the catalyzer layers in the removal process, and the resonant-hole insulating regions 106 may be formed through other measures.

While the preferred embodiments of the invention have been described, it is to be understood that the invention is not limited thereto, and may be otherwise embodied within the scope of the following claims.

For example, in the embodiments, as the examples of the dielectric filter, the comb line type and the interdigital type have been described. The manufacture method according to the invention can be applied to other types of the dielectric filter. Also, in the embodiments, in the ultrasonic cutter, the cutting liquid is spouted from the nozzle which is provided separately from the tool. Alternatively, by making a hole in the tool 24 by passing the cutting liquid toward a tip end of the tool, the cutting liquid may be supplied form the tool itself.

What is claimed is:

1. A method of manufacturing a dielectric filter which is provided with a porcelain element body, which comprises the steps of:

applying a catalyzer for electroless plating to said porcelain element body and forming a catalyzer layer on a surface of said porcelain element body;

removing the catalyzer layer from an insulating region on said porcelain element body wherein said step of removing the catalyzer layer is performed with an ultrasonic cutter comprising a power of 30 watts and a resonance frequency of 25 kHz for a time period of from 0.1 to 0.5 seconds; and electroless-plating, with a conductive layer, a region of said porcelain element body where said catalyzer layer has not been removed.

2. A method of manufacturing a dielectric filter according to claim 1, wherein said step of removing the catalyzer layer comprises removing the catalyzer layer from a region which entirely surrounds a periphery of a second region wherein the catalyzer layer has not been removed.

3. A method of manufacturing a dielectric filter according to claim 2, wherein said step of electroless plating comprises forming a conductive layer on said second region.

4. A method of manufacturing a dielectric filter which is provided with a porcelain element body, which comprises the steps of:

applying a catalyzer for electroless plating to said porcelain element body thereby forming a catalyzer layer on said porcelain element body;

removing said catalyzer layer from a first region of said porcelain element body such that said catalyzer layer remains on a second region of said porcelain element body wherein said step of removing the catalyzer layer is performed with an ultrasonic cutter comprising a power of 30 watts and a resonance frequency of 25 kHz for a time period of from 0.1 to 0.5 seconds;

electroless plating said porcelain element body with a conductive layer, whereby said conductive layer is formed on said second region of said porcelain element body.

5. A method of manufacturing a dielectric filter according to claim 4, wherein said step of removing the catalyzer layer comprises removing the catalyzer layer to form a pad insulating region which surrounds at least a portion of said second region to thereby form an input/output region.

* * * * *